(12) United States Patent
Kaneta

(10) Patent No.: US 12,323,033 B2
(45) Date of Patent: Jun. 3, 2025

(54) MOTOR WITH MOTOR SHAFT HAVING HOLLOW STRUCTURE AND SUPPORTED BETWEEN CASE MAIN BODY AND CASE LID

(71) Applicant: HONDA MOTOR CO., LTD., Tokyo (JP)

(72) Inventor: Kazuya Kaneta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 207 days.

(21) Appl. No.: 18/159,418

(22) Filed: Jan. 25, 2023

(65) Prior Publication Data

US 2023/0291272 A1    Sep. 14, 2023

(30) Foreign Application Priority Data

Mar. 14, 2022    (JP) .................................. 2022-038880

(51) Int. Cl.
*H02K 7/00*    (2006.01)

(52) U.S. Cl.
CPC .................................. *H02K 7/003* (2013.01)

(58) Field of Classification Search
CPC .......... H02K 1/28; H02K 7/003; H02K 7/083; H02K 5/1732; H02K 1/30; H02K 2213/03
USPC ...................................................... 310/75 D
See application file for complete search history.

(56) References Cited

U.S. PATENT DOCUMENTS

2018/0147937 A1    5/2018   Muster et al.
2021/0159755 A1*   5/2021   Boden .................... H02K 7/003

FOREIGN PATENT DOCUMENTS

| DE | 102012011002 A1 * | 12/2013 | ........... H02K 1/2733 |
| DE | 102017102151 A1 * | 8/2018  | |
| JP | 2018518137 A      | 7/2018  | |
| KR | 20170118218 A  *  | 10/2017 | |
| WO | WO-2021173054 A1* | 9/2021  | ........... H02K 1/2766 |

OTHER PUBLICATIONS

Machine Translation of DE_102012011002_A1 (Year: 2013).*
Machine Translation of DE_102017102151_A1 (Year: 2018).*
Machine Translation of KR_20170118218_A (Year: 2017).*
Machine Translation of WO_2021173054_A1 (Year: 2021).*

* cited by examiner

*Primary Examiner* — Alexander A Singh
*Assistant Examiner* — Charlie Frank Mann, Jr.
(74) *Attorney, Agent, or Firm* — Armstrong Teasdale LLP

(57) ABSTRACT

A motor shaft includes a first shaft portion, a second shaft portion, a hollow intermediate shaft portion, a first connecting portion connecting the first shaft portion to the intermediate shaft portion, and a second connecting portion connecting the second shaft portion to the intermediate shaft portion. The intermediate shaft portion has an outer diameter larger than outer diameters of the first and second shaft portions and supports a rotor core on an outer circumference thereof. The motor shaft is configured to include a first member integrally formed to include the first shaft portion and the first connecting portion and a second member integrally formed to include the second shaft portion and the second connecting portion. At least one of the first connecting portion and the second connecting portion is provided with an outer flange that protrudes radially outward from an outer circumferential surface of the intermediate shaft portion.

9 Claims, 4 Drawing Sheets

MOTOR WITH MOTOR SHAFT HAVING HOLLOW STRUCTURE AND SUPPORTED BETWEEN CASE MAIN BODY AND CASE LID

TECHNICAL FIELD

The present invention relates to a motor shaft, and more specifically relates to a motor shaft having a hollow intermediate shaft portion on which a rotor core is supported.

BACKGROUND ART

Conventionally, as a rotor shaft (motor shaft) of an electric motor, a shaft having a hollow structure is known (see JP2018-518137A). On an outer circumference of an axially central region of this hollow shaft, a rotor of the motor in the form of a laminated pack (rotor core) is fastened. The hollow shaft includes a first shaft section on one side in the axial direction of the rotor and a second shaft section on another side in the axial direction of the rotor, and is mounted to the vehicle body via two rolling bearings provided on these shaft sections. The axially central region of the hollow shaft has a sleeve shape, and the openings at both ends of the sleeve shape portion are closed by a first closure part and a second closure part. The first closure part is integrally joined to the first shaft section, and the second closure part is integrally joined to the second shaft section. The two closure parts are fixedly joined to the sleeve shape portions by way of an interference fit or a weld seam. The inner diameter of the sleeve shape portion is significantly larger than the inner diameters of the two rolling bearings. In other words, the motor shaft has a stepped shape in which the radial dimension thereof varies significantly depending on the axial position. In connection with this, the motor shaft is configured by three members coupled to each other in the axial direction. Due to such a configuration, even though the motor shaft has a shape with a varying radial dimension, it is ensured that the motor shaft can be manufactured easily.

However, in the above conventional technology, though the rotor core is fastened to the outer circumference of the motor shaft, the rotor core may inadvertently move in the axial direction of the motor shaft. Also, when fixing the rotor core to the outer circumference of the motor shaft, the axial position of the rotor core may deviate from a desired position.

SUMMARY OF THE INVENTION

In view of the foregoing background, a primary object of the present invention is to provide a motor shaft capable of preventing the rotor core from inadvertently moving in the axial direction of the motor shaft or preventing the axial position of the rotor core from deviating from a desired position when fixing the rotor core to the outer circumference of the motor shaft.

To achieve the above object, one aspect of the present invention provides a motor shaft (5, 105), comprising: a first shaft portion (21) supported by a motor case (2) to be rotatable about an axis; a second shaft portion (22) supported by the motor case to be rotatable about the axis at a position spaced from the first shaft portion in an axial direction; a hollow intermediate shaft portion (23) having an outer diameter (D3) larger than an outer diameter (D1) of the first shaft portion and an outer diameter (D2) of the second shaft portion and disposed between the first shaft portion and the second shaft portion to support a rotor core (6) on an outer circumference thereof; a first connecting portion (24) connecting the first shaft portion to the intermediate shaft portion; and a second connecting portion (25) connecting the second shaft portion to the intermediate shaft portion, wherein the motor shaft is configured to comprise a first member (31, 131) integrally formed to include at least the first shaft portion and the first connecting portion and a second member (32, 132) integrally formed to include at least the second shaft portion and the second connecting portion, and at least one of the first connecting portion and the second connecting portion is provided with an outer flange (27, 28) that protrudes radially outward from an outer circumferential surface (23a) of the intermediate shaft portion.

With this configuration, movement of the rotor core in the axial direction is restricted by the outer flange. Therefore, it is possible to prevent the rotor core from moving in the axial direction of the motor shaft or to prevent the axial position of the rotor core from deviating from a desired position when fixing the rotor core to the outer circumference of the motor shaft. Also, since processing such as perforation for adjusting the rotation balance of the rotor can be applied to the outer flange, it is possible to effectively correct the imbalance. Note that because the motor shaft has a multi-component configuration including at least the first member and the second member, the motor shaft can be manufactured easily.

Preferably, an outer diameter (D4, D5) of the outer flange (27, 28) is smaller than an outer diameter (D6) of the rotor core.

With this configuration, it is possible to prevent the outer flange from contacting the stator core of the motor disposed on the outer circumference side of the rotor core.

Preferably, each of the first connecting portion (24) and the second connecting portion (25) is provided with the outer flange (27, 28).

With this configuration, the movement of the rotor core in both directions along the axial direction is restricted by the outer flanges. Therefore, inadvertent movement of the rotor core can be suppressed in both directions along the axial direction.

Preferably, the motor shaft (5) further comprises an output portion (26) integrally formed with the first shaft portion (21) to extend out (2) of the motor case, wherein the first member (31) further includes the intermediate shaft portion (23).

With this configuration, the motor shaft with the intermediate shaft portion having a larger diameter than those of the first shaft portion and the second shaft portion can be configured by two members, i.e., the first member and the second member. Therefore, it is possible to reduce the number of components of the motor shaft and the assembly man-hours of the motor shaft. Also, since the first member includes the output portion and the intermediate shaft portion, the torque transmission route in the rotor core is concentrated in the first member, and a large torque does not act on the coupling part between the first member and the second member. Therefore, the coupling structure between the first member and the second member can be simplified.

In the configuration in which the first member (31) further includes the intermediate shaft portion (23), preferably, the first member is provided with an inner flange (34) at an end portion of the intermediate shaft portion in the axial direction opposite from the first connecting portion, the inner flange is formed with multiple threaded holes (35) arranged at intervals in a circumferential direction, and the second connecting portion (25) of the second member (32) is fastened to the inner flange of the first member with multiple bolts (36) that are threadably engaged with the threaded holes.

With this configuration, when the second member is assembled to the first member, the second member can be easily fastened to the first member with the multiple bolts.

In the configuration in which the first member (31) further includes the intermediate shaft portion (23), preferably, the intermediate shaft portion of the first member is slip-fitted to the second connecting portion (25) of the second member (32).

With this configuration, positioning at the time of assembly of the first member and the second member is easy.

Preferably, the motor shaft (105) further comprises a third member (133) formed as a separate member from the first member (131) and the second member (132) to include the intermediate shaft portion (23).

With this configuration, the shape of each of the first to third members becomes simple, and therefore, the manufacture of the first to third members is easy.

In the configuration in which the motor shaft (105) further comprises the third member (133), preferably, the intermediate shaft portion (23) of the third member is provided with inner flanges (34) formed at either end thereof in the axial direction, each inner flange is formed with multiple threaded holes (35) arranged at intervals in a circumferential direction, and the first connecting portion (24) of the first member (131) and the second connecting portion (25) of the second member (132) are fastened to the corresponding inner flanges of the third member with multiple bolts (36) that are threadably engaged with the threaded holes.

With this configuration, when the first member and the second member are assembled to the third member, the first and second members can be easily fastened to the third member with the multiple bolts.

In the configuration in which the motor shaft (105) further comprises the third member (133), preferably, the intermediate shaft portion of the third member (23) is slip-fitted to the first connecting portion (24) of the first member (131) and the second connecting portion (25) of the second member (132).

With this configuration, positioning at the time of assembly of the third member to the first member and the second member is easy.

According to the foregoing aspect, it is possible to provide a motor shaft capable of preventing the rotor core from inadvertently moving in the axial direction of the motor shaft or preventing the axial position of the rotor core from deviating from a desired position when fixing the rotor core to the outer circumference of the motor shaft.

DETAILED DESCRIPTION OF THE INVENTION

In the following, embodiments of the present invention will be described in detail with reference to the drawings.

First Embodiment

Figure 1:
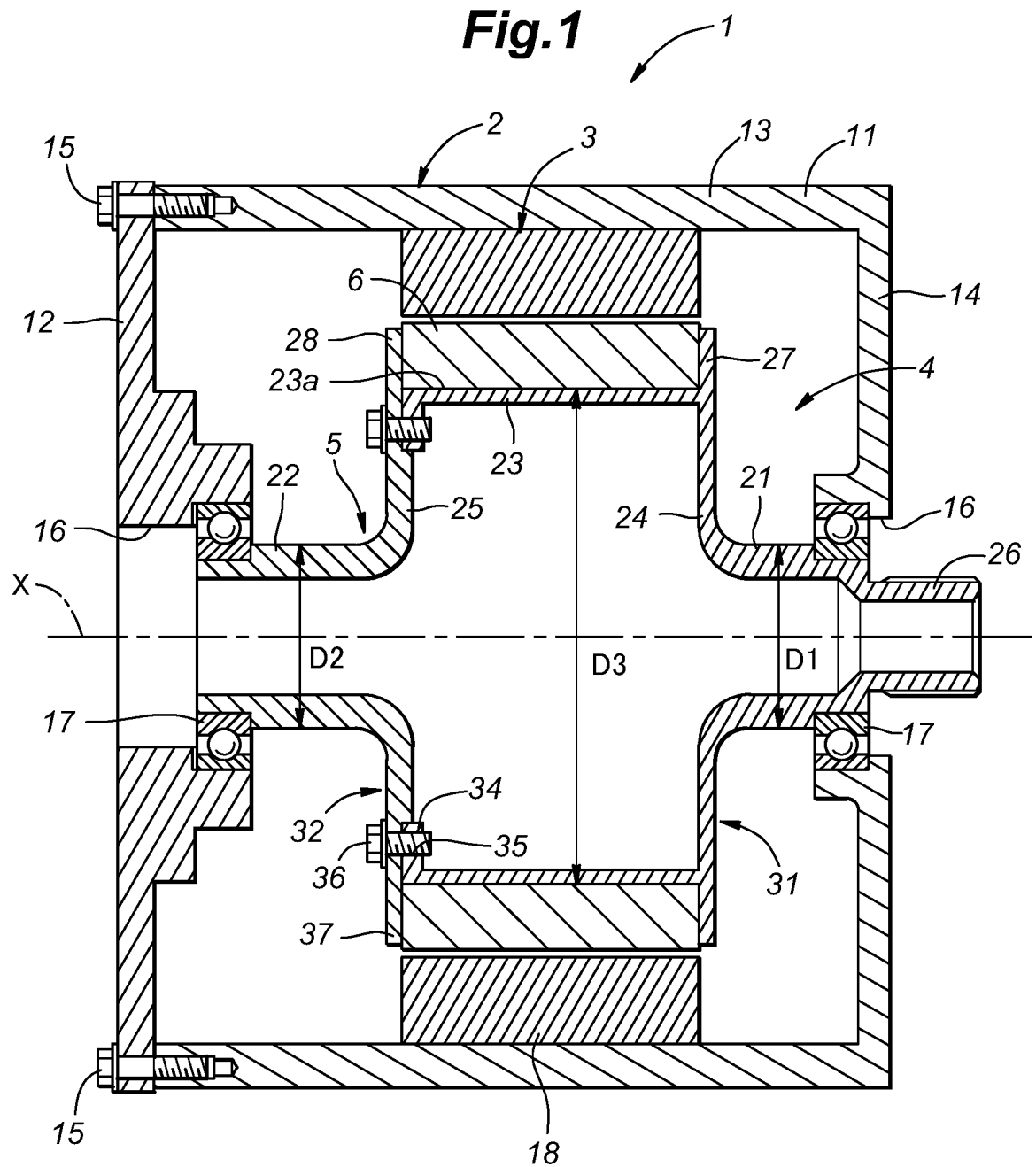
FIG. 1 is a sectional view of a motor according to a first embodiment of the present invention.
Figure 2:
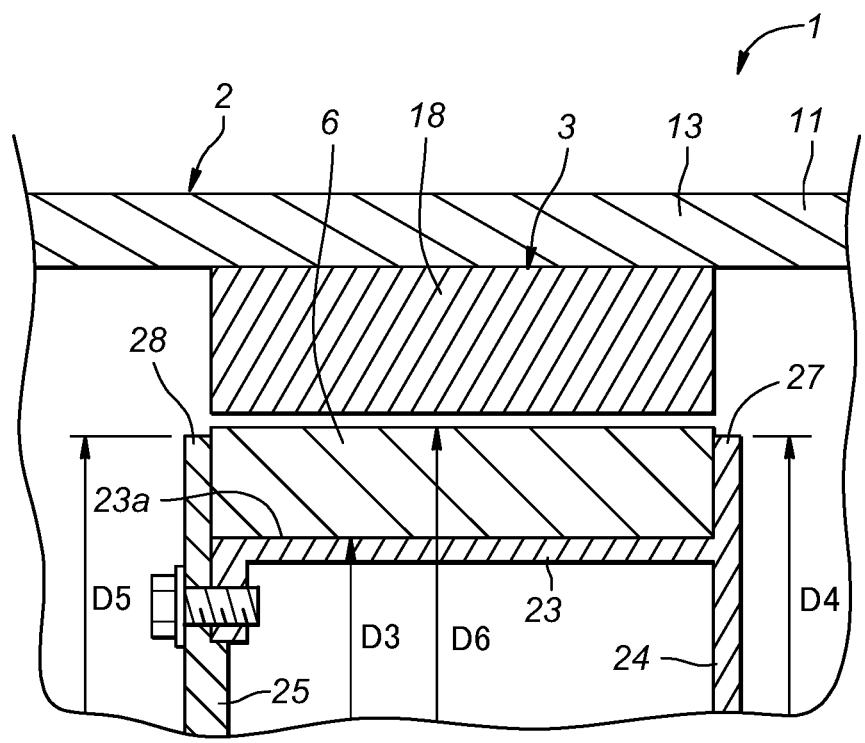
FIG. 2 is an enlarged view of a main part of FIG. 1.

First, with reference to FIGS. 1 and 2, a first embodiment of the present invention will be described. FIG. 1 is a sectional view of a motor 1 according to the first embodiment, and FIG. 2 is an enlarged view of a main part of FIG. 1. As shown in FIG. 1, the motor 1 includes a motor case 2, a stator 3 fixed inside the motor case 2, and a rotor 4 rotatably supported by the motor case 2. The rotor 4 includes a motor shaft 5 extending along an axis X and a rotor core 6 provided on the outer circumference of the motor shaft 5.

The motor case 2 includes a case main body 11 having a bottomed cylindrical shape and a case lid 12 that closes the opening of the case main body 11. The case main body 11 has a cylindrical wall 13 and a bottom wall 14, and the case lid 12 is detachably attached to the cylindrical wall 13 of the case main body 11 with circumferentially arranged multiple bolts 15.

The bottom wall 14 of the case main body 11 and the case lid 12 are formed with respective support holes 16 for supporting the motor shaft 5. At least one of the support holes 16 is formed as a through hole. The other of the support holes 16 may be formed as a through hole or may be formed as a concave hole. In the illustrated example, the both support holes 16 are formed as through holes. The support holes 16 are respectively provided with rolling bearings 17. The motor shaft 5 is rotatably supported by the motor case 2 via the two rolling bearings 17.

The stator 3 includes multiple stator cores 18 arranged in the circumferential direction to form multiple teeth around which coils are wound. The stator core 18 is formed of multiple laminated steel plates that are laminated in the axial direction of the motor shaft 5. The rotor core 6 is disposed inside the stator core 18, and the outer circumferential surface of the rotor core 6 opposes the inner circumferential surface of the stator core 18 via a gap (see FIG. 2). The rotor core 6 is formed of multiple laminated steel plates that are laminated in the axial direction of the motor shaft 5, and forms multiple magnet accommodating portions. Multiple permanent magnets are accommodated in the magnet accommodating portions of the rotor core 6.

The motor shaft 5 is formed of a metal member having a hollow structure. An inside of the motor shaft 5 communicates with an outside of the motor case 2 via the support holes 16 formed as the through holes. The motor shaft 5 is provided with a first shaft portion 21 supported by the case main body 11 to be rotatable about the axis X and a second shaft portion 22 disposed in a position spaced from the first shaft portion 21 in the axial direction and supported by the case lid 12 to be rotatable about the axis X. The first shaft portion 21 has an outer diameter D1, and an end portion of the first shaft portion 21 where the rolling bearing 17 is provided is thinned with an outer circumferential part thereof scraped off. The second shaft portion 22 has an outer diameter D2, and an end portion of the second shaft portion 22 where the rolling bearing 17 is provided is thinned with an outer circumferential part thereof scraped off. The outer diameter D2 of the second shaft portion 22 may be the same as or different from the outer diameter D1 of the first shaft portion 21.

Between the first shaft portion 21 and the second shaft portion 22 of the motor shaft 5, an intermediate shaft portion 23 is provided. The intermediate shaft portion 23 has an outer diameter D3 larger than the outer diameter D1 of the first shaft portion 21 and the outer diameter D2 of the second shaft portion 22 and supports the rotor core 6 on the outer circumference thereof. The first shaft portion 21 and the intermediate shaft portion 23 are connected to each other by a first connecting portion 24 having a circular annular shape. The second shaft portion 22 and the intermediate shaft portion 23 are connected to each other by a second connecting portion 25 having a circular annular shape. The first connecting portion 24 and the second connecting portion 25 each has an annular disc-like shape. In another embodiment, at least one of the first connecting portion 24 and the second connecting portion 25 may have a truncated-cone tubular shape.

At an end portion of the first shaft portion 21 opposite from the intermediate shaft portion 23, an output portion 26 is integrally formed to extend out of the motor case 2. The output portion 26 is a part that outputs the torque of the rotor 4 to transmit the torque to other members, and is constituted of a spline shaft formed with multiple teeth for power transmission. The output portion 26 is formed to have a smaller diameter than the diameter of the end portion of the first shaft portion 21 on which the rolling bearing 17 is provided. In the illustrated example, multiple teeth are formed on the outer circumferential surface of the output portion 26. In another example, multiple teeth may be formed on the inner circumferential surface of the output portion 26.

The first connecting portion 24 is provided with a first outer flange 27 that protrudes radially outward from the outer circumferential surface 23a of the intermediate shaft portion 23. The second connecting portion 25 is provided with a second outer flange 28 that protrudes radially outward from the outer circumferential surface 23a of the intermediate shaft portion 23. Thereby, the rotor core 6 is disposed between the first outer flange 27 and the second outer flange 28. Each of the first and second outer flanges 27, 28 is thinner than both the first and second shaft portions 21, 22.

As shown in FIG. 2, the first outer flange 27 has an outer diameter D4, the second outer flange 28 has an outer diameter D5, and the rotor core 6 has an outer diameter D6. The outer diameter D4 of the first outer flange 27 and the outer diameter D5 of the second outer flange 28 are each smaller than the outer diameter D6 of the rotor core 6. Namely, the first outer flange 27 and the second outer flange 28 are positioned radially inside of the outer circumferential surface of the rotor core 6. Thereby, the first outer flange 27 and the second outer flange 28 are prevented from contacting the stator core 18 of the motor 1 disposed on the outer circumference side of the rotor core 6. The outer diameter D5 of the second outer flange 28 may be the same as or different from the outer diameter D4 of the first outer flange 27.

As shown in FIG. 1, the motor shaft 5 is configured by a first member 31 and a second member 32. The first member 31 configures the intermediate shaft portion 23, the first connecting portion 24, the first shaft portion 21, and the output portion 26. The second member 32 configures the second connecting portion 25 and the second shaft portion 22.

The first outer flange 27 is integrally formed on the first connecting portion 24 and is configured by the first member 31. The second outer flange 28 is integrally formed on the second connecting portion 25 and is configured by the second member 32. The first member 31 and the second member 32 are manufactured, for example, by cutting an intermediate member formed by casting. Alternatively, the first member 31 and the second member 32 may be manufactured by machining. Thus, the motor shaft 5 has a multi-component configuration including at least the first member 31 and the second member 32, and therefore, the motor shaft 5 can be manufactured easily although the motor shaft 5 has a shape with a varying radial dimension.

An end portion of the first member 31 on the side of the second member 32, namely, an end portion of the intermediate shaft portion 23 in the axial direction opposite from the first connecting portion 24 is integrally formed with an inner flange 34 that protrudes radially inward. The inner flange 34 is formed with multiple threaded holes 35 at intervals in the circumferential direction. The threaded holes 35 are only required to be formed in at least positions in the circumferential direction. For example, the threaded holes 35 are formed in eight positions in the circumferential direction at an equal interval (45 degree interval).

The second connecting portion 25 is formed with multiple bolt holes in positions corresponding to the threaded holes 35, namely, in positions more inward than the second outer flange 28 (more inward than the outer circumferential surface 23a of the intermediate shaft portion 23). The second member 32 is fixed to the first member 31 with the second connecting portion 25 being fastened to the inner flange 34 with multiple bolts 36 that are threadably engaged with the threaded holes 35. Thereby, when the second member 32 is assembled to the first member 31, the second member 32 can be easily fastened to the first member 31 with the multiple bolts 36.

A part of the second connecting portion 25 opposing the first member 31 is formed with a thin part 37 that matches the shape of the inner flange 34 and the intermediate shaft portion 23 of the first member 31 is slip-fitted to the second connecting portion 25 of the second member 32. Specifically, the thin part 37 defines a circular stepped portion (shoulder portion) on the surface of the second connecting portion 25 facing the first member 31, and the intermediate shaft portion 23 of the first member 31 is fitted onto the shoulder portion to be close contact with the shoulder surface (outer circumferential surface) of the shoulder portion. Thereby, positioning at the time of assembly of the first member 31 and the second member 32 is easy.

The rotor core 6 is fitted on the outer circumference of the intermediate shaft portion 23 from the side of the second member 32 before the second member 32 is fastened to the first member 31. As described above, the first member 31 is provided with the first outer flange 27. Therefore, when the rotor core 6 is fixed to the outer circumference of the motor shaft 5, the axial position of the rotor core 6 is prevented from deviating from a desired position. Also, movement of the rotor core 6 in the axial direction is restricted by the first outer flange 27, and therefore, it is possible to prevent the rotor core 6 from moving toward the first outer flange 27 in the axial direction of the motor shaft 5 after the rotor core 6 is fixed to the outer circumference of the motor shaft 5.

The second member 32 is assembled to the first member 31 after the rotor core 6 is fixed to the outer circumference of the motor shaft 5. Once the second member 32 is assembled to the first member 31, the rotor core 6 is disposed between the first outer flange 27 and the second outer flange 28, as described above. Therefore, movement of the rotor core 6 in both directions along the axial direction is restricted by the first outer flange 27 and the second outer flange 28.

The first member 31 is configured to include the intermediate shaft portion 23 in addition to the first shaft portion 21 and the output portion 26. In other words, the motor shaft 5 with the intermediate shaft portion 23 having a larger diameter than those of the first shaft portion 21 and the second shaft portion 22 is configured by two members, i.e., the first member 31 and the second member 32. Therefore, it is possible to reduce the number of components of the motor shaft 5 and the assembly man-hours of the motor shaft 5. Also, since the first member 31 includes the output portion 26 and the intermediate shaft portion 23, the torque transmission route in the rotor core 6 is concentrated in the first member 31, and a large torque does not act on the coupling part between the first member 31 and the second member 32. Therefore, the coupling structure between the first member 31 and the second member 32 can be simplified.

Further, since the motor shaft 5 is provided with the first outer flange 27 and the second outer flange 28, processing such as perforation for adjusting the rotation balance of the rotor 4 can be applied to the outer flange. Therefore, the imbalance can be effectively corrected. From this viewpoint, it is preferred that the outer diameter D4 of the first outer flange 27 and the outer diameter D5 of the second outer flange 28 shown in FIG. 2 are not only larger than the outer diameter D3 of the intermediate shaft portion 23, but also as large as possible within a range smaller than the outer diameter D6 of the rotor core 6.

Second Embodiment

Next, with reference to FIG. 3, a second embodiment of the present invention will be described. Note that the same or similar elements as those of the first embodiment will be denoted by identical reference signs and redundant description may be omitted as appropriate.

Figure 3:
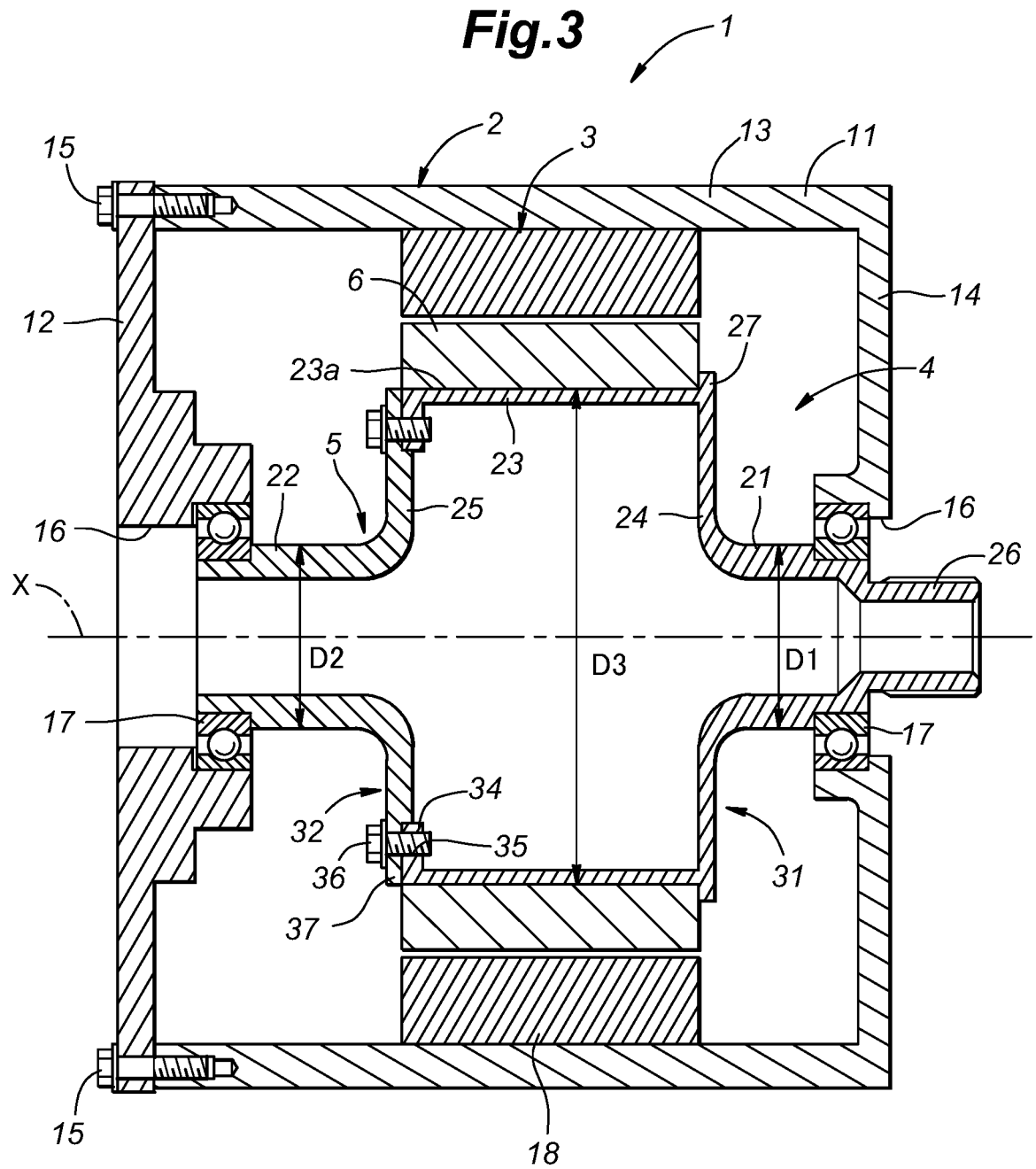
FIG. 3 is a sectional view of a motor according to a second embodiment of the present invention.

FIG. 3 is a sectional view of a motor 1 according to the second embodiment. In this embodiment also, the motor shaft 5 is configured by the first member 31 and the second member 32. The first member 31 configures the intermediate shaft portion 23, the first connecting portion 24, the first shaft portion 21, and the output portion 26. The second member 32 configures the second connecting portion 25 and the second shaft portion 22.

The first outer flange 27 is integrally formed on the first connecting portion 24 and is configured by the first member 31. The outer diameter D4 of the first outer flange 27 is smaller than in the first embodiment. The second member 32 is provided with the second connecting portion 25, but the second outer flange 28 is not integrally formed on the second connecting portion 25. In other words, the motor shaft 5 is not provided with the second outer flange 28.

Even when the motor shaft 5 is configured as this, when the rotor core 6 is fixed to the outer circumference of the motor shaft 5, the axial position of the rotor core 6 is prevented from deviating from a desired position. Also, since the movement of the rotor core 6 in the axial direction is restricted by the first outer flange 27, it is possible to prevent the rotor core 6 from moving toward the first outer flange 27 in the axial direction of the motor shaft 5 after the rotor core 6 is fixed to the outer circumference of the motor shaft 5.

Note that instead of the first outer flange 27 integrally formed on the first connecting portion 24, the second outer flange 28 may be integrally formed on the second connecting portion 25. In other words, the motor shaft 5 does not have to be provided with the first outer flange 27. In this case, the rotor core 6 should be fixed to the outer circumference of the motor shaft 5 after the second member 32 is assembled to the first member 31. By manufacturing the rotor 4 in such a procedure, it is possible to prevent the axial position of the rotor core 6 from deviating from a desired position when fixing the rotor core 6 to the outer circumference of the motor shaft 5.

Third Embodiment

Next, with reference to FIG. 4, a third embodiment of the present invention will be described. Note that the same or similar elements as those of the first embodiment or the second embodiment will be denoted by identical reference signs and redundant description may be omitted as appropriate.

Figure 4:
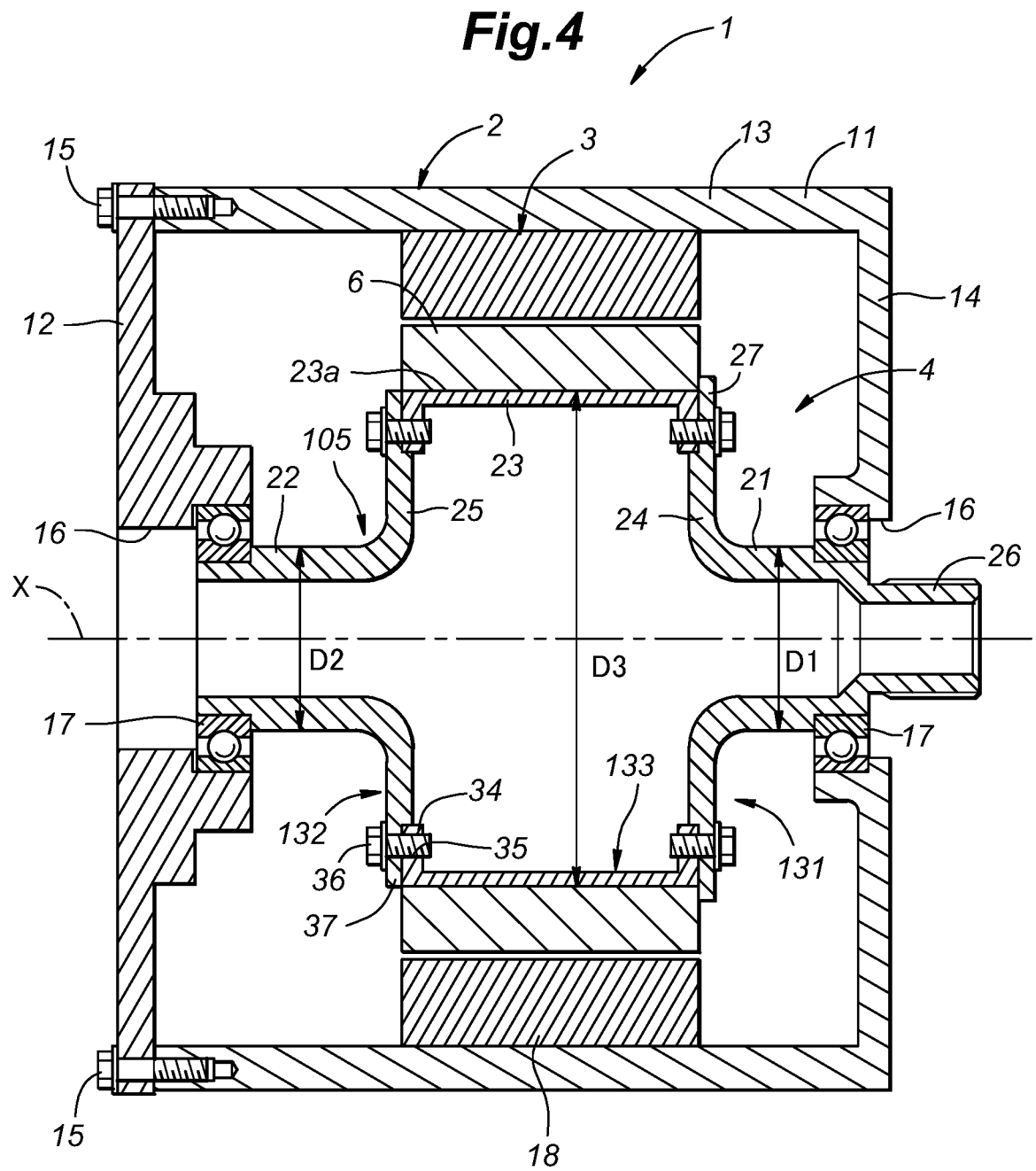
FIG. 4 is a sectional view of a motor according to a third embodiment of the present invention.

FIG. 4 is a sectional view of a motor 1 according to the third embodiment. In this embodiment, the motor shaft 105 is configured by a first member 131, a second member 132, and a third member 133. The first member 131 configures the first connecting portion 24, the first shaft portion 21, and the output portion 26. The second member 132 configures the second connecting portion 25 and the second shaft portion 22. The third member 133 configures the intermediate shaft portion 23.

The first outer flange 27 is integrally formed on the first connecting portion 24 and is configured by the first member 131. The second member 132 is provided with the second connecting portion 25, but the second outer flange 28 is not integrally formed on the second connecting portion 25. The second member 132 is not provided with the second outer flange 28. The first member 131, the second member 32, and the third member 133 are manufactured by cutting an intermediate member formed by casting, for example. Alternatively, the first member 31, the second member 32, and the third member 133 may be manufactured by machining. Thus, since the motor shaft 5 of the third embodiment has a multi-component configuration including three members, the motor shaft 5 of the third embodiment can be manufactured more easily than the first and second embodiments.

The both end portions of the third member 133 in the axial direction, namely, the end portions of the intermediate shaft portion 23 in the axial direction, are integrally formed with respective inner flanges 34 that protrude radially inward. Each inner flange 34 is formed with multiple threaded holes 35 arranged at intervals in the circumferential direction.

The first connecting portion 24 and the second connecting portion 25 are formed with multiple bolt holes in positions corresponding to the threaded holes 35, namely, in positions more inward than the outer circumferential surface 23a of the intermediate shaft portion 23. The first member 131 and the second member 132 are fixed to the third member 133 with the first connecting portion 24 and the second connecting portion 25 being fastened to the corresponding inner flanges 34 with multiple bolts 36 that are threadably engaged with the threaded holes 35. Thereby, when the first member 131 and the second member 132 are assembled to the third member 133, the first member 131 and the second member 132 can be easily fastened to the third member 133 with the multiple bolts 36.

A part of the first connecting portion 24 opposing the third member 133 and a part of the second connecting portion 25 opposing the third member 133 are each formed with a thin part 37 that matches the shape of the corresponding inner flange 34. The intermediate shaft portion 23 of the third member 133 is slip-fitted to the first connecting portion 24 of the first member 131 and the second connecting portion 25 of the second member 132. Specifically, the thin part 37 of the first connecting portion 24 defines a circular stepped portion (shoulder portion) on the surface of the first connecting portion 24 facing the first member 31 and the thin part 37 of the second connecting portion 25 defines a circular stepped portion (shoulder portion) on the surface of the second connecting portion 25 facing the first member 31, and each axial end of the intermediate shaft portion 23 of the third member 133 is fitted onto the corresponding shoulder portion to be close contact with the shoulder surface (outer circumferential surface) of the shoulder portion. Thereby, positioning at the time of assembly of the third member 133 to the first member 131 and the second member 132 is easy.

Concrete embodiments of the present invention have been described in the foregoing, but the present invention is not limited to the above embodiments and may be modified or altered in various ways. For example, in the above embodiments, the first shaft portion 21 and the second shaft portion 22 of the motor shaft 5, 105 were hollow similarly to the intermediate shaft portion 23, but they may be solid. Besides, the concrete structure, arrangement, number, material, manufacturing method, etc. of each member or part may be appropriately changed without departing from the spirit of the present invention. The configurations of the above embodiments may be partially combined with one another. Also, not all of the components shown in the above embodiments are necessarily indispensable and they may be selectively adopted as appropriate.

The invention claimed is:

1. A motor, comprising:
a motor case having a case main body having a cylindrical case body with a bottomed cylindrical shape and an opening, and a case lid attached to the case main body with circumferentially arranged multiple bolts and closing the opening of the case main body, and
a motor shaft rotatably supported between the case main body and the case lid via two rolling bearings, the motor shaft comprising:
a first shaft portion supported by a motor case to be rotatable about an axis;
a second shaft portion supported by the motor case to be rotatable about the axis at a position spaced from the first shaft portion in an axial direction;
a hollow intermediate shaft portion having an outer diameter larger than an outer diameter of the first shaft portion and an outer diameter of the second shaft portion and disposed between the first shaft portion and the second shaft portion to support a rotor core on an outer circumference thereof;
a first connecting portion connecting the first shaft portion to the intermediate shaft portion; and
a second connecting portion connecting the second shaft portion to the intermediate shaft portion,
wherein the motor shaft is formed of metal members each having a hollow structure, and is configured to comprise a first member integrally formed to include at least the first shaft portion and the first connecting portion and a second member integrally formed to include at least the second shaft portion and the second connecting portion, and
each of the first connecting portion and the second connecting portion is provided with an outer flange that protrudes radially outward from an outer circumferential surface of the hollow intermediate shaft portion, the outer flange being thinner than the first and second shaft portions.

2. The motor-shaft according to claim 1, wherein an outer diameter of the outer flange is smaller than an outer diameter of the rotor core.

3. The motor-shaft according to claim 1, further comprising an output portion integrally formed with the first shaft portion to extend out of the motor case,
wherein the first member further includes the intermediate shaft portion.

4. The motor according to claim 3, wherein the first member is provided with an inner flange at an end portion of the intermediate shaft portion in the axial direction opposite from the first connecting portion, the inner flange is formed with multiple threaded holes arranged at intervals in a circumferential direction, and the second connecting portion of the second member is fastened to the inner flange of the first member with multiple bolts that are threadably engaged with the threaded holes.

5. The motor according to claim 3, wherein the intermediate shaft portion of the first member is slip-fitted to the second connecting portion of the second member.

6. The motor according to claim 1, further comprising a third member formed as a separate member from the first member and the second member to include the intermediate shaft portion.

7. The motor according to claim 6, wherein the intermediate shaft portion of the third member is provided with inner flanges formed at either end thereof in the axial direction, each inner flange is formed with multiple threaded holes arranged at intervals in a circumferential direction, and the first connecting portion of the first member and the second connecting portion of the second member are fastened to the corresponding inner flanges of the third member with multiple bolts that are threadably engaged with the threaded holes.

8. The motor according to claim 6, wherein the intermediate shaft portion of the third member is slip-fitted to the first connecting portion of the first member and the second connecting portion of the second member.

9. The motor according to claim 1, wherein the case main body has a cylindrical wall that defines the opening and a bottom wall, the bottom wall of the case main body and the case lid are formed with respective support holes for supporting the motor shaft and provided with the rolling bearings, at least one of the support holes is formed as a through hole, and an inside of the motor shaft communicates with an outside of the motor case via the through hole.

* * * * *